UNITED STATES PATENT OFFICE.

JOHN F. WOOD, OF BOSTON, MASSACHUSETTS, ASSIGNOR TO THE UNION STONE COMPANY, OF SAME PLACE.

IMPROVEMENT IN THE MANUFACTURE OF EMERY-WHEELS.

Specification forming part of Letters Patent No. 110,102, dated December 13, 1870.

Be it known that I, JOHN F. WOOD, of Boston, in Massachusetts, have invented an Improvement in the Manufacture of Emery-Wheels by forming the center thereof of cheap artificial stone and the circumference of greater or lesser thickness of artificial emery-stone.

I am agent and treasurer of the Union Stone Company, which manufactures large quantities of emery-wheels and other artificial stone under patents granted to Stainslas Sorel and others.

I find that emery-wheels of large diameter may be made under my invention at very much less than the usual cost, because the artificial stone which forms the center and a large proportion of the weight of the wheel may be formed of materials which cost only a tenth or twentieth of those which compose the ordinary emery-wheel, and that wheels so made are in no respect inferior to those made solid in the usual manner, so long as the emery is not worn out.

The process of manufacturing emery-wheels under this invention is as follows: I take the ordinary composition for emery-wheels as prepared and mixed ready for the mold. I place in the center of the mold a wooden disk, filling all the mold, except so much of the circumference as is designed to be of emery-stone. Into the space thus left the emery composition is pressed, rammed, or tamped in the ordinary way. The wooden disk is then removed, and, before the composition sets, the center space is filled with composition for artificial stone, prepared in the ordinary way, and this is pressed, rammed, or tamped, and the whole is allowed to set and harden, and thus a solid wheel is formed.

I am aware that centers of iron have been used in emery-wheels; but they are more expensive than those of artificial stone, and cannot be made to unite so perfectly as the artificial stone and emery in my process.

The danger of throwing off the circumference of large wheels by great velocity requires that the whole be firmly cemented in one mass, which is hardly practicable with an iron center, but is easy by my process; and, again, the danger of fracture of the wheels by the unequal expansion of iron and emery-stone by heat is avoided by this invention.

What I claim as my invention, and desire to secure by Letters Patent, is—

1. Emery-wheels having their centers of artificial stone, substantially as and for the purposes described.

2. The process of manufacturing emery-wheels, having the central part of artificial stone, substantially as and for the purposes described.

JOHN F. WOOD.

Witnesses:
A. E. WOOD,
HENRY F. FRENCH.